US011653313B2

(12) United States Patent
Wang et al.

(10) Patent No.: US 11,653,313 B2
(45) Date of Patent: *May 16, 2023

(54) POWER CONTROL METHOD AND USER EQUIPMENT IN DEVICE TO DEVICE COMMUNICATION IN SERVING CELL

(71) Applicant: Sun Patent Trust, New York, NY (US)

(72) Inventors: Lilei Wang, Beijing (CN); Hidetoshi Suzuki, Kanagawa (JP); Sujuan Feng, Frankfurt (DE); Masayuki Hoshino, Kanagawa (JP); Joachim Loehr, Hessen (DE)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/355,019

(22) Filed: Jun. 22, 2021

(65) Prior Publication Data

US 2021/0314881 A1 Oct. 7, 2021

Related U.S. Application Data

(63) Continuation of application No. 16/875,671, filed on May 15, 2020, now Pat. No. 11,076,363, which is a (Continued)

(51) Int. Cl.
*H04W 52/24* (2009.01)
*H04W 4/70* (2018.01)
(Continued)

(52) U.S. Cl.
CPC .......... *H04W 52/247* (2013.01); *H04W 4/70* (2018.02); *H04W 52/10* (2013.01); (Continued)

(58) Field of Classification Search
CPC ..... H04W 52/247; H04W 4/70; H04W 52/10; H04W 52/146; H04W 52/362; H04W 52/248; H04W 52/383; H04W 52/58
See application file for complete search history.

(56) References Cited

U.S. PATENT DOCUMENTS 9,084,203 B2 7/2015 Madan et al.
9,794,950 B2 10/2017 Ryu et al.
(Continued)

FOREIGN PATENT DOCUMENTS

CN 102823311 A 12/2012
CN 103139889 A 6/2013
(Continued)

OTHER PUBLICATIONS

Alcatel-Lucent Shanghai Bell et al., "Consideration of Interference Mitigation for D2D Communication," Rl-132993, Agenda Item: 7.2.8, 3GPP TSG-RAN1 Meeting #74, Barcelona, Spain, Aug. 19-23, 2013, 4 pages.
(Continued)

*Primary Examiner* — John J Lee
(74) *Attorney, Agent, or Firm* — Seed IP Law Group LLP

(57) ABSTRACT

The present disclosure provides a power control method in device to device (D2D) communication and a user equipment for performing the power control method. The method includes computing a power value of device to device (D2D) transmission of a user equipment performing D2D communication in a subframe in a serving cell, based on a power control adjustment state of a Long Term Evolution (LTE) wide area network (WAN) uplink channel of the user equipment and an offset or a ratio indicated by a transmit power control (TPC) command indicated in D2D grant or downlink control information (DCI) format 3/3A.

16 Claims, 3 Drawing Sheets

Related U.S. Application Data continuation of application No. 16/284,887, filed on Feb. 25, 2019, now Pat. No. 10,701,642, which is a continuation of application No. 15/983,999, filed on May 18, 2018, now Pat. No. 10,271,289, which is a continuation of application No. 15/380,094, filed on Dec. 15, 2016, now Pat. No. 10,004,046, which is a continuation of application No. PCT/CN2014/083886, filed on Aug. 7, 2014.

(51) Int. Cl.

| | | |
|---|---|---|
| *H04W 52/58* | (2009.01) | |
| *H04W 52/14* | (2009.01) | |
| *H04W 52/36* | (2009.01) | |
| *H04W 52/38* | (2009.01) | |
| *H04W 52/10* | (2009.01) | |

(52) U.S. Cl.
CPC ....... *H04W 52/146* (2013.01); *H04W 52/248* (2013.01); *H04W 52/362* (2013.01); *H04W 52/383* (2013.01); *H04W 52/58* (2013.01)

(56) References Cited

U.S. PATENT DOCUMENTS

| | | | |
|---|---|---|---|
| 9,807,709 | B2 | 10/2017 | Deng et al. |
| 2009/0325625 | A1 | 12/2009 | Hugl et al. |
| 2010/0285830 | A1 | 11/2010 | Englund et al. |
| 2011/0275382 | A1* | 11/2011 | Hakola ................. H04W 24/10 455/452.2 |
| 2012/0155337 | A1 | 6/2012 | Park |
| 2014/0086193 | A1 | 3/2014 | Suzuki et al. |
| 2014/0185530 | A1* | 7/2014 | Kuchibhotla ..... H04W 72/0446 370/329 |
| 2014/0198694 | A1 | 7/2014 | Yang et al. |
| 2014/0274196 | A1 | 9/2014 | Dai et al. |
| 2016/0014834 | A1 | 1/2016 | Chang et al. |
| 2017/0063595 | A1* | 3/2017 | Ma .......................... H04L 65/40 |
| 2017/0215027 | A1 | 7/2017 | Yokomakura et al. |
| 2017/0230918 | A1* | 8/2017 | Ryu ........................ H04L 5/003 |
| 2019/0075612 | A1* | 3/2019 | Fukuta ................. H04W 76/10 |

FOREIGN PATENT DOCUMENTS

| | | | |
|---|---|---|---|
| CN | 103179575 | A | 6/2013 |
| CN | 103686861 | A | 3/2014 |
| JP | 2011-509592 | A | 3/2011 |
| JP | 2012-244378 | A | 12/2012 |
| JP | 2014-503140 | A | 2/2014 |
| WO | 2013/181444 | A2 | 12/2013 |
| WO | 2014/050010 | A1 | 4/2014 |
| WO | 2016/017672 | A1 | 2/2016 |

OTHER PUBLICATIONS

Alcatel-Lucent Shanghai Bell et al., "D2D discovery channel design," R1-140175, Agenda Item: 7.2.8.2.1, 3GPP TSG RAN Meeting #76, Prague, Czech Republic, Feb. 10-14, 2014, 9 pages.

Huawei et al., "Power control for D2D Signals," R1-141928, Agenda Item: 6.2.5.1.3, 3GPP TSG RAN WG1 Meeting #77, Seoul, Korea, May 19-23, 2014, 4 pages.

International Search Report, dated Mar. 27, 2015, for corresponding International Application No. PCT/CN2014/083886, 2 pages.

"Applicable RRC states for Mode2", R2-141714, 3GPP TSG-RAN WG2 #85bis, Agenda Item: 7.4.2, Valencia, Spain, Mar. 31-Apr. 4, 2014, 3 pages.

LG Electronics, et al., "WF on D2D power control for communication Mode 1," R1-142642, 3GPP TSG RAN WG1 #77, Agenda item: 6.2.5.2.2, May 19-23, 2014, 3 pages.

English Translation of Chinese Search Report, dated Mar. 1, 2019, for the related Chinese Patent Application No. 201480079248.X.

Extended European Search Report, dated Jun. 30, 2017, for corresponding European Application No. 14899440.3-1875 / 3178264, 8 pages.

NSN, Nokia, "WAN protection by configurable D2D transmission power control," R1-142454, 3GPP TSG-RAN WG1 Meeting #77, Agenda Item: 6.2.5.4, Seoul, Korea, May 19-23, 2014, 3 pages.

Qualcomm et al., "WF on D2D Power Control," R1-142623, 3GPP TSG RAN WG1 Meeting #77, Seoul, Korea, May 19-23, 2014, 3 pages.

Patil, "Status Report to TSG," R1-140648, 3GPP TSG RAN Meeting #64, Sophia Antipolis, France, Jun. 10-13, 2014, 25 pages.

Patil, "Status Report to TSG," R1-141015 3GPP TSG RAN Meeting #64, Sophia Antipolis, France, Jun. 10-13, 2014, 25 pages.

* cited by examiner

COMPUTING POWER VALUE OF D2D TRANSMISSION OF USER EQUIPMENT PERFORMING D2D COMMUNICATION IN SUBFRAME IN SERVING CELL, BASED ON POWER CONTROL ADJUSTMENT STATE OF LTE WAN UPLINK CHANNEL OF USER EQUIPMENT AND OFFSET OR RATIO INDICATED BY TPC COMMAND INDICATED IN D2D GRANT OR DCI FORMAT 3/3A ~ S201

POWER CONTROL METHOD AND USER EQUIPMENT IN DEVICE TO DEVICE COMMUNICATION IN SERVING CELL

BACKGROUND

Technical Field

The present disclosure relates to the field of wireless communication, and particularly, to a power control method and user equipment in device to device (D2D) communication in a serving cell.

Description of the Related Art

The D2D communication is direct communication between devices, and such kind of communication could happen within network coverage and without network coverage.

FIG. 1 shows a situation in which D2D direct communication is performed within network coverage and D2D direct communication is performed without network coverage.

As shown in FIG. 1, user equipments 101 and 102 directly communicate within network coverage of an E-UTRAN node B (eNB) 100, while user equipments 103 and 104 directly communicate without network coverage of the eNB 100.

When D2D user equipments are in a Long Term Evolution (LTE) wide area network (WAN), they may be operated in LTE WAN and D2D communication simultaneously. That means, in some radio resources/subframes, D2D user equipments transmit/receive LTE WAN signals, but in other radio resources/subframes, D2D user equipments transmit/receive D2D signals. This also depends on which mode D2D user equipments are operated in. Currently there are two modes that a user equipment could be operated in: mode 1 in which an eNB (like base station) or a release-10 relay node schedules exact resources used by a user equipment to transmit direct data and direct control information; and mode 2 in which a user equipment on its own selects resources from resource pools to transmit direct data and direct control information.

In mode 1, the resources for D2D transmission are allocated or fully controlled by the eNB, but in mode 2, the user equipment itself selects the resources for D2D transmission. Generally, in mode 1, D2D user equipments (for example in RRC_CONNECTED) could receive dedicated RRC signaling from the eNB, but in mode 2, D2D user equipments (for example in RRC_IDLE) can only receive common RRC signaling, for example, a system information block (SIB). In this document, the focus is mainly user equipments in mode 1.

If D2D resources and LTE WAN resources are multiplexed in the same subframe, there are problems of in-band emission and inter-carrier interference. The first problem means that a D2D signal may cause power leakage to neighbor LTE WAN signals in the frequency domain in the same subframe. The second problem somehow has a meaning similar to the first problem but it may be caused by other reasons, for example, whether the timing of signals are aligned. If a D2D signal uses an extended cyclic prefix (CP) but an LTE WAN signal uses a normal CP (NCP), which means the timing of two types of signals are not aligned, it may lead to inter-carrier interference.

SUMMARY

The present disclosure is made in view of the above consideration.

In one general aspect, the techniques disclosed here feature a power control method including computing a power value of device to device (D2D) transmission of a user equipment performing D2D communication in a subframe in a serving cell, based on a power control adjustment state of a Long Term Evolution (LTE) wide area network (WAN) uplink channel of the user equipment and an offset or a ratio indicated by a transmit power control (TPC) command indicated in D2D grant or downlink control information (DCI) format 3/3A.

In another aspect, there is provided a computer program product. The computer program product includes a storage medium which may be accessed by a computer and store instructions which are executed by the computer to perform each step of the power control method provided by the above aspect.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figures 1, 2:
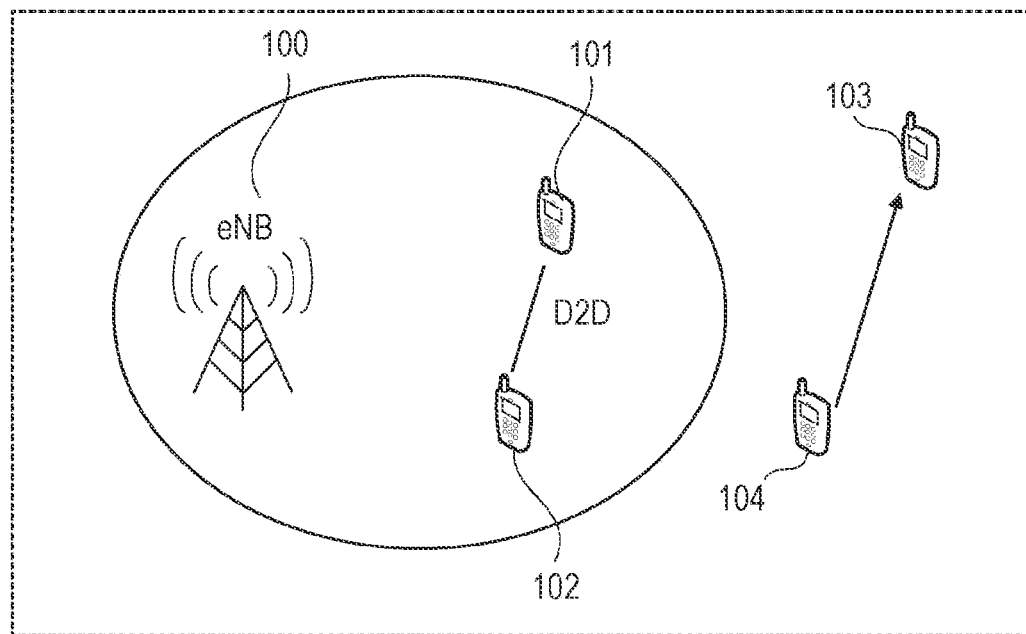
FIG. 1 shows a situation in which D2D direct communication is performed within network coverage and D2D direct communication is performed without network coverage.
FIG. 2 shows a flowchart of a power control method according to an embodiment of the present disclosure.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

Power control was approved already by many companies in the 3rd Generation Partnership Project (3GPP) as a good/valid solution to solve above two problems compared with other solutions. For example, the other solutions may be as follows. A guard band is used to solve the in-band emission issue, but resources are wasted; aligned timing (the same CP or timing advance) between a D2D communication and an LTE WAN communication is used, but the issue is that it may not solve the in-band emission. Or LTE WAN resources are not allocated in D2D subframes to avoid the above problems, but it may give a big impact to WAN physical uplink control channel (PUCCH) timing specification or LTE WAN resource utilization. So from this point of view, the power control is a very promising/necessary solution in the D2D transmission. But of course, the power control could also combine any of the above three solutions.

On the other hand, however, the problem about the D2D power control is that many details are not concluded yet, for example, the following issues: how to control the D2D power to reduce interference to LTE WAN resources, how to accumulate power for D2D and LTE WAN signals/subframes, how to configure power control parameters for different D2D user equipments, and what the TPC command range is.

One straightforward solution is that the D2D and LTE WAN signals/subframes adopt totally independent power control mechanisms (including open-loop components like $P_0$ and alpha ($\alpha$) and closed-loop components like fc( )). The merit of such solution is that the eNB could adjust D2D power flexibly without caring about LTE WAN interference, and it is friendly to the D2D coverage. But the problems of this solution are: (1) the eNB can not accurately control D2D power to reduce interference to the LTE WAN due to inaccurate knowledge of LTE WAN transmission power (the eNB does not know fc( )) and D2D transmission power (no D2D power headroom report (PHR) and reference signal received power (RSRP) so far); and (2) the user equipment complexity is increased due to dual independent power accumulation functions.

Another straightforward solution is that open-loop power control parameters like $P_0$ and alpha of D2D communication are independently configured between D2D and LTE WAN signals/subframes, but an accumulation function is shared between D2D and LTE WAN signals/subframes. That means that subframe i's power (LTE WAN subframe) will be accumulated to subframe i+1's power (D2D subframe) for the same user equipment or vice versa. The merit of such solution is that it only considers one accumulation function. But the problems of this solution are: (1) LTE WAN power/performance is impacted by D2D power (mutual impact); and (2) it may lead to very dynamic WAN signal power change in eNB reception, and instable receiving performance results in that automatic gain control (AGC) in radio frequency (RF) part can not work well.

FIG. 2 shows a flowchart of a power control method according to an embodiment of the present disclosure.

As shown in FIG. 2, the power control method according to the embodiment includes step S201. In step S201, a power value of device to device (D2D) transmission of a user equipment performing D2D communication in a subframe in a serving cell is computed based on a power control adjustment state of an LTE wide area network (WAN) uplink channel of the user equipment and an offset or a ratio indicated by a TPC command indicated in D2D grant or DCI format 3/3A.

According to an embodiment of the present disclosure, in the above power control method, the uplink channel is any of a PUSCH, an SRS, and a PUCCH or a combination of them.

According to an embodiment of the present disclosure, in the above power control method, the power value is further decided by open-loop parameters including $P_0$ and alpha (a) of D2D communication configured by media access control (MAC) layer signaling or radio resource control (RRC) signaling.

Specifically, if the uplink channel is a PUSCH, the power value may be calculated by the following formula (1).

$$10\log_{10}(M_{D2D,c}(i))+P_{D2D,c}(j)+\alpha_{D2D,c}(j)\cdot PL_c+\Delta_{TF,c}(i)+f_c(i-1)+\delta_{D2D,c}(i-K_{D2D}) \quad (1)$$

Here, the parameter $M_{D2D,c}(i)$ is the bandwidth of the D2D resource assignment expressed in number of resource blocks valid for the subframe i and the serving cell "c". The parameter $P_{D2D,c}(j)$ is a parameter which means a targeted received power of an eNB of the serving cell "c". The parameter "j" means different grant types, for example, in PUSCH transmissions, in case of a semi-persistent grant, then j=0, in case of a dynamic scheduled grant, then j=1, and in case of a random access response grant, then j=2. According to another embodiment, the parameter $P_{D2D,c}( )$ may also be fixed in specification instead of multiple values.

The parameter $PL_c$ is the downlink pathloss estimate (between the eNB and D2D user equipment) calculated in the user equipment for the serving cell "c" in dB, and $PL_c$=referenceSignalPower−higher layer filtered RSRP. Here, "referenceSignalPower" may be provided by high-layer signaling. The parameter $\alpha_{D2D,c}(j)$ is a compensation coefficient of the downlink pathloss $PL_c$. According to another embodiment of the present disclosure, in the above power control method, for j=0 or 1, $\alpha_c(j)\in\{0, 0.4, 0.5, 0.6, 0.7, 0.8, 0.9, 1\}$ is a 3-bit parameter provided by higher layer signaling for the serving cell "c", and for j=2, $\alpha_c(j)=1$.

The parameter $\Delta_{TF,c}(i)$ is a minor offset similar to that of the current PUSCH power control formula.

The power control adjustment state of LTE WAN uplink channel of the user equipment in the latest LTE WAN subframe is $f_c(i-1)$. That could be accumulated/absolute power value of an uplink subframe immediately before the subframe i, of the same user equipment in the LTE WAN. And such value is adjusted by a TPC command indicated by LTE WAN subframe grant, for example, DCI format 0/4 or DCI format 3/3A, used for PUSCH power adjustment.

In the present embodiment, the offset or ratio indicated by the TPC command may be the parameter $\delta_{D2D,c}(i-K_{D2D})$, which is a correction value used for the D2D communication, and included in the D2D grant or indicated in DCI format 3/3A, in which there are two options: option (1), the D2D TPC command and the LTE WAN TPC command are located in the same DCI format 3/3A; and option (2), only the D2D TPC commands are in DCI format 3/3A.

In the present embodiment, the offset and/or ratio indicate only zero or a negative value. For example, if $\delta_{D2D,c}(i-K_{D2D})$ indicates the offset, the value range of $\delta_{D2D,c}(i-K_{D2D})$ is $\{0, -10\}$dB, and if $\delta_{D2D,c}(i-K_{D2D})$ indicates the ratio, the value range of $\delta_{D2D,c}(i-K_{D2D})$ is $\{0, -0.1\}$dB. In this case, the length of such field is 1 bit. In case the length of such field is 2 bits, the range could be further extended, for example $\{0, -5, -10, -15\}$dB.

Further, when $\delta_{D2D,c}(i-K_{D2D})$ indicates the ratio, the formula (2) is used for computing the power control value of the user equipment in D2D communication.

$$10\log_{10}(M_{D2D,c}(i))+P_{D2D,c}(j)+\alpha_{D2D,c}(j)\cdot PL_c+\Delta_{TF,c}(i)+f_c(i-1)+\delta_{D2D,c}(i-K_{D2D})f_c(i-1) \quad (2)$$

Compared with the formula (1) in the above embodiment, the only difference of the formula (2) is that a ratio to PUSCH accumulation/absolute power "$f_c(i-1)$" is used. And such ratio is also indicated in the D2D grant or DCI format 3/3A. Here, since the TPC command range for such ratio could be, for example, $\{0, -0.1\}$dB, only reduction to the PUSCH power is considered here for the D2D power.

Figure 3:
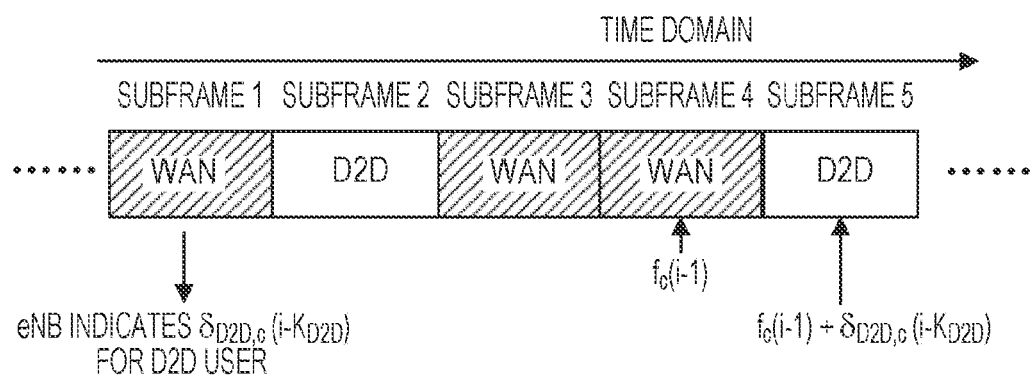
FIG. 3 shows an example of subframes of a user equipment according to an embodiment of the present disclosure.

FIG. 3 shows an example of subframes of the same user equipment used for D2D and LTE WAN communication according to an embodiment of the present disclosure.

As shown in FIG. 3, there are illustrated five subframes in the time domain direction used for the same user equipment, that is, subframe 1, subframe 2, subframe 3, subframe 4, and subframe 5, and assuming that subframes 2 and 5 are used for the D2D communication of the user equipment, and subframes 1, 3 and 4 are used for the LTE WAN communication of the same user equipment. For example, it is here assumed that "i"=5, that is, the user equipment needs to calculate the D2D power control for subframe 5, so the user equipment will copy the adjustment state "$f_c(i-1)$" of the PUSCH channel in the WAN subframe 4 for the D2D subframe 5, and add the parameter ($\delta_{D2D,c}(i-K_{D2D})$) indicated in the subframe 1 by the eNB for the final adjustment state of D2D communication based on the formula (1). Here, the $K_{D2D}$ is 4. The open-loop parameters like $P_{D2D,c}$ and $\alpha_{D2D,c}(j)$ are indicated via an SIB.

From this example, it can be seen that the D2D user equipment does not need accumulation power specially for D2D subframes. Instead, it just copies $f_c(i-1)$ of the PUSCH and adds a dynamic adjustment value ($\delta_{D2D,c}(i-K_{D2D})$) indicated in the TPC command in the D2D grant or DCI format 3/3A. Regarding the TPC command range indicated in the D2D grant or DCI format 3/3A, it could be only zero/negative value, for example, {0, −10}dB.

The benefits of the above embodiment are: the eNB could relatively accurately control the D2D power to LTE WAN interference as it mimics the power of PUSCH for the D2D communication; it does not need independent power accumulation specially for the D2D; the LTE WAN power accumulation is not impacted by the D2D communication; and the received power in the eNB side is relatively stable (friendly to AGC).

According to another embodiment, if the uplink channel is a PUCCH or an SRS, the PUCCH or SRS's power value is considered as the reference for the D2D power control. In this case, for example, the formula (3) is used for computing the power value of the D2D user equipment:

$$10 \log_{10}(M_{D2D,c}(i)) + P_{D2D,c}(j) + \alpha_{D2D,c}(j) \cdot PL_c + \Delta_{TF,c}(i) + 0.5(f_c(i-1) + g(i-1)) + \epsilon_{D2D,c}(i-K_{D2D}) \quad (3)$$

Here, the parameter "$g(i-1)$" is the latest PUCCH power control adjustment state.

According to another embodiment of the present disclosure, in the above power control method, the DCI format 3/3A could combine a TPC command of the LTE WAN communication and a TPC command of the D2D communication or just consist of the TPC commands of the D2D communication.

Figure 4:
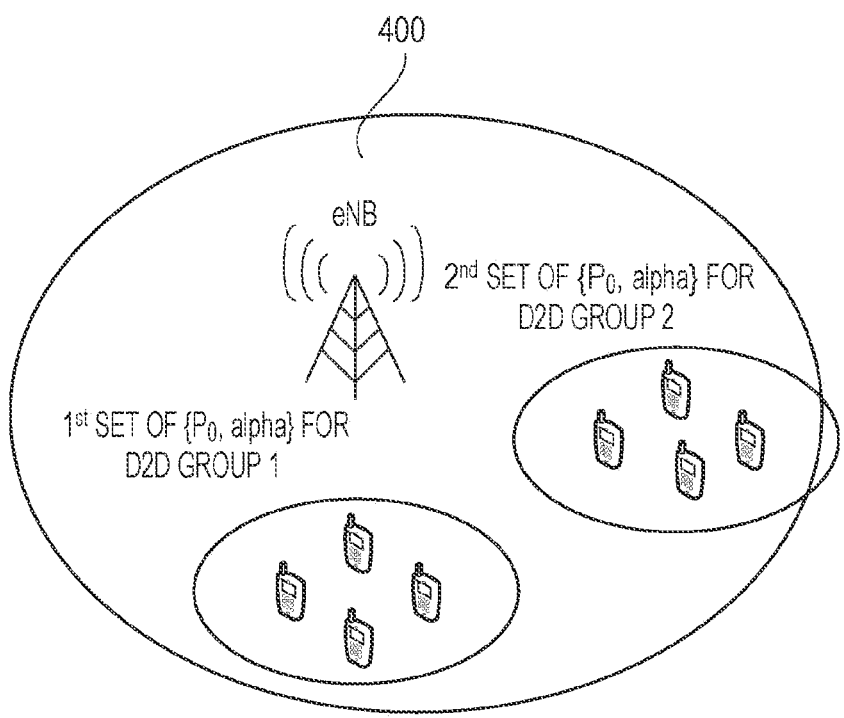
FIG. 4 shows an example of multiple D2D groups in the same serving cell according to an embodiment of the present disclosure.

FIG. 4 shows an example of multiple D2D groups in the same serving cell according to an embodiment of the present disclosure.

As shown in FIG. 4, for example, there are multiple D2D groups (only two groups are shown herein, but it is not limited to two groups) in the same cell. Then, the eNB will indicate several sets of power control parameters via an SIB, for example, the first set of {$P_0$, alpha} is indicated for the D2D group 1, and the second set of {$P_0$, alpha} is indicated for the D2D group 2. That is, according to an embodiment of the present disclosure, in the above power control method, the $P_0$ and alpha are configured differently among D2D user equipment groups in the same cell via an SIB.

According to another embodiment of the present disclosure, different power control parameters, such as $P_0$ and alpha of D2D communication, are differentiated based on the resource allocation mode of the D2D or RRC status. For example, $P_0$ and alpha of D2D communication are configured separately for mode 1 and mode 2 from D2D resource allocation point of view. Or for example, $P_0$ and alpha of D2D communication are configured separately for user equipments in RRC_CONNECTED and user equipments in RRC_IDLE. Furthermore, for a user equipment in the RRC_CONNECTED status, $P_0$ and alpha of D2D communication are configured by dedicated RRC signaling.

According to an embodiment of the present disclosure, in the above power control method, when the uplink channel is a PUSCH, the $P_{D2D,c}(j)$ may be configured differently from $P_{O\_PUSCH,c}(j)$, and the $\alpha_{D2D,c}(j)$ may be configured differently from $\alpha_c(j)$, in the power control of uplink channel of the same user equipment in the LTE wide area network, and they are signaled by RRC or MAC signaling.

Figure 5:
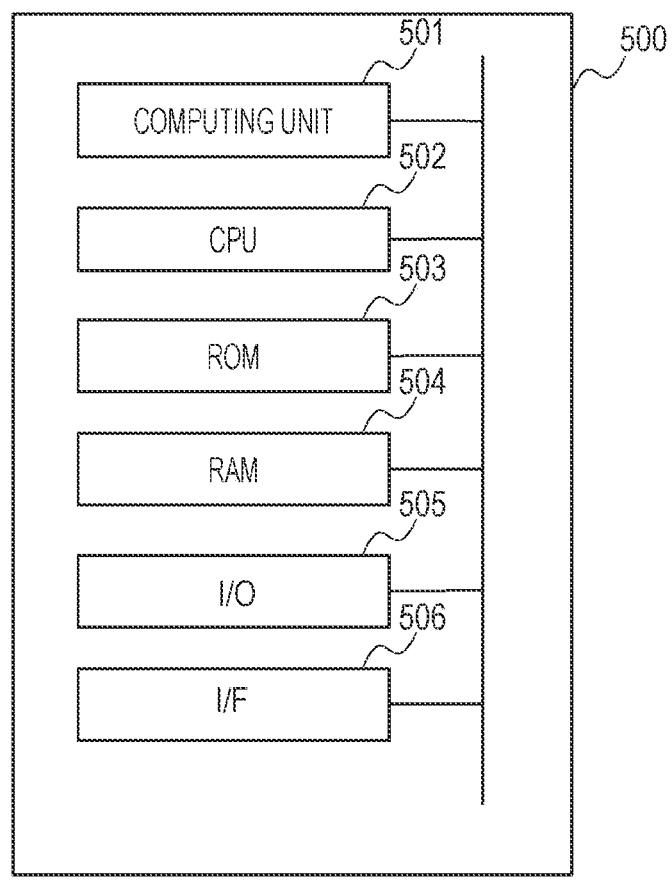
FIG. 5 shows a block diagram of the user equipment according to an embodiment of the present disclosure.

FIG. 5 shows a block diagram of the user equipment according to an embodiment of the present disclosure.

As shown in FIG. 5, the user equipment 500 used in the device to device (D2D) communication according to an embodiment of the present disclosure includes a computing unit 501. The computing unit 501 is configured to compute a power value of device to device (D2D) transmission of a user equipment performing D2D communication in a subframe in a serving cell, based on a power control adjustment state of an LTE wide area network (WAN) uplink channel of the user equipment and an offset or a ratio indicated by a TPC command indicated in D2D grant or DCI format 3/3A.

According to another embodiment of the present disclosure, in the user equipment 500, the uplink channel is any of a PUSCH, an SRS, and a PUCCH or a combination of them.

According to another embodiment of the present disclosure, in the user equipment 500, the power value is further decided by open-loop parameters including $P_0$ and alpha of D2D communication configured by MAC layer signaling or RRC signaling.

According to another embodiment of the present disclosure, in the user equipment 500, the offset and ratio indicate only zero or a negative value.

According to another embodiment of the present disclosure, in the user equipment 500, the DCI format 3/3A could combine a TPC command of LTE WAN communication and a TPC command of D2D communication or just consist of the TPC commands of D2D communication.

According to another embodiment of the present disclosure, in the user equipment 500, the $P_0$ and alpha of D2D communication are configured separately for a user equipment in an RRC_CONNECTED status and a user equipment in an RRC_IDLE status.

According to another embodiment of the present disclosure, in the user equipment 500, the $P_0$ and alpha of D2D communication are configured separately based on a resource allocation mode which could be mode 1 in which the eNB or release-10 relay node schedules exact resources used by the user equipment or mode 2 in which the user equipment on its own selects resources from resource pools.

According to another embodiment of the present disclosure, in the user equipment 500, for a user equipment in an RRC_CONNECTED status, the $P_0$ and alpha of D2D communication are configured by dedicated RRC signaling.

According to another embodiment of the present disclosure, in the user equipment 500, $P_0$ and alpha are configured differently among D2D user equipment groups in the same cell via an SIB.

According to another embodiment of the present disclosure, the user equipment 500 may further include a central processing unit (CPU) 502 for executing related programs to process various kinds of data and control the operations of respective units in the user equipment 500; a read-only memory (ROM) 503 for storing various programs required by the CPU to perform various kinds of processing and controls; a random access memory (RAM) 504 for storing intermediate data temporarily generated by the CPU in the processing and control procedure; an input/output (I/O) unit 505 for connecting to the outside devices to transmit various kinds of data between an outside device and the user equipment 500 according to an embodiment of the present disclosure; and a user interface (I/F) unit 506 which includes a keyboard, a mouse, a touch pad, and other devices implemented by various devices that may interact with the user. These devices or units may be coupled to the computing unit 501 and so on in the user equipment 500 via a bus to perform various controls and related operations to realize various corresponding functions of the present disclosure.

According to an embodiment of the present disclosure, the functions of the computing unit 501 may be realized by storing a program in the ROM 503 and executing the program in the CPU 502. According to an embodiment of the present disclosure, respective devices (units) in the user equipment 500 may be implemented by combining into one unit. Their specific implementation does not limit the scope of the present disclosure.

Based on the above description, the present disclosure proposes to mimic LTE WAN's power of the same user equipment for D2D transmission in order to make the LTE WAN interference controllable, for example, the PUSCH adjustment state (e.g., fc( ) is used as reference for D2D accumulation power. In this case, there is no need for special accumulation implementation for D2D user equipment within D2D subframes. The open-loop parameters like alpha and $P_0$ in D2D communication could be set in the same manner as those in LTE WAN communication. The offset or ratio to the PUSCH adjustment state (for example fc( ), which would be indicated in a TPC command in D2D grant or DCI format 3/3A, is used to further adjust the D2D power to LTE WAN interference. In variant solutions, any other LTE WAN channel's power or a combination of them of the same user equipment could be referred for the D2D power. And in the proposals, open-loop parameters like $P_0$ and alpha of D2D communication could be configured differently between mode 1 and mode 2, or between RRC_IDLE and RRC_CONNECTED statuses. And open-loop parameters like $P_0$ and alpha used by D2D communication could be indicated by dedicated RRC parameters. And the SIB could indicate several sets of open-loop parameters to support multiple D2D groups in the same cell; for example, a first set of $\{P_0, alpha\}$ is used for D2D group 1, and a second set of $\{P_0, alpha\}$ is used for D2D group 2.

The present disclosure can be realized by software, hardware, or software in cooperation with hardware. Each functional block used in the description of the embodiments described above can be realized by an LSI as an integrated circuit. They may be individually formed as chips, or one chip may be formed so as to include a part or all of the functional blocks. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a field programmable gate array (FPGA) that can be programmed after the manufacture of the LSI or a reconfigurable processor in which the connections and the settings of circuits cells disposed inside the LSI can be reconfigured may be used.

Further, the calculation of each functional block can be performed by using a calculating device, for example, including a DSP or a CPU, and the processing step of each function may be recorded on a recording medium as a program for execution. Furthermore, when a technology for implementing an integrated circuit that substitutes the LSI appears in accordance with the advancement of the semiconductor technology or other derivative technologies, it is apparent that the functional block may be integrated by using such technologies.

It is noted that the present disclosure intends to be variously changed or modified by those skilled in the art based on the description presented in the specification and known technologies without departing from the content and the scope of the present disclosure, and such changes and applications fall within the scope that is claimed to be protected. Furthermore, in a range not departing from the content of the disclosure, the constituent elements of the above-described embodiments may be arbitrarily combined.

The invention claimed is:

1. A base station, comprising:
   circuitry, which, in operation, configures a first set of parameters and a second set of parameters for device to device (D2D) communication independently; and
   a transmitter, which, in operation, transmits to a communication apparatus of the D2D communication the first set of parameters and the second set of parameters,
      wherein a transmission power for the D2D communication is determined using a Transmit Power Command (TPC) included in a D2D grant without accumulating one or more previous TPCs, and using one of: the first set of parameters for D2D transmission mode 1 or the second set of parameters for D2D transmission mode 2, and
      wherein the transmission power for the D2D communication is determined using a pathloss (PL) value that is a downlink path loss estimate value for a serving cell.

2. The base station according to claim 1, wherein the D2D transmission mode 1 is a transmission mode where a scheduling of the D2D communication is performed by the base station, and the D2D transmission mode 2 is another transmission mode where a scheduling of the D2D communication is performed by the communication apparatus.

3. The base station according to claim 1, wherein the D2D transmission mode 1 is for an RRC_CONNECTED user equipment and the D2D transmission mode 2 is for at least an RRC_IDLE user equipment.

4. The base station according to claim 1, wherein the first set of parameters and the second set of parameters are transmitted via a Radio Resource Control (RRC) signaling.

5. The base station according to claim 1, wherein the first set of parameters includes a first $P_0$ and a first a for the D2D transmission mode 1 and the second set of parameters includes a second $P_0$ and a second $\alpha$ for the D2D transmission mode 2, wherein the first $P_0$ and the second $P_0$ are each a power parameter and the first a and the second a are each a pathloss-related coefficient.

6. The base station according to claim 1, wherein the first set of parameters is configured for a first group of user equipments and the second set of parameters is configured for a second group of user equipments that is different from the first group of user equipments.

7. The base station according to claim 1, wherein a transmission power for another communication between the communication apparatus and the base station is determined using the TPC included in a grant for the other communication with accumulating one or more previous TPCs included in grants of the other communication.

8. The base station according to claim 1, wherein the first set of parameters is different from the second set of parameters.

9. A communication method performed by a base station, comprising:
    configuring a first set of parameters and a second set of parameters for device to device (D2D) communication independently; and
    transmitting to a communication apparatus of the D2D communication the first set of parameters and the second set of parameters,
        wherein a transmission power for the D2D communication is determined using a Transmit Power Command (TPC) included in a D2D grant without accumulating one or more previous TPCs, and using one of: the first set of parameters for D2D transmission mode 1 or the second set of parameters for D2D transmission mode 2, and
        wherein the transmission power for the D2D communication is determined using a pathloss (PL) value that is a downlink path loss estimate value for a serving cell.

10. The communication method according to claim 9, wherein the D2D transmission mode 1 is a transmission mode where a scheduling of the D2D communication is performed by the base station, and the D2D transmission mode 2 is another transmission mode where a scheduling of the D2D communication is performed by the communication apparatus.

11. The communication method according to claim 9, wherein the D2D transmission mode 1 is for an RRC_CONNECTED user equipment and the D2D transmission mode 2 is for at least an RRC_IDLE user equipment.

12. The communication method according to claim 9, wherein the first set of parameters and the second set of parameters are transmitted via a Radio Resource Control (RRC) signaling.

13. The communication method according to claim 9, wherein the first set of parameters includes a first $P_0$ and a first a for the D2D transmission mode 1 and the second set of parameters includes a second $P_0$ and a second a for the D2D transmission mode 2, wherein the first $P_0$ and the second $P_0$ are each a power parameter and the first a and the second a are each a pathloss-related coefficient.

14. The communication method according to claim 9, wherein the first set of parameters is configured for a first group of user equipments and the second set of parameters is configured for a second group of user equipments that is different from the first group of user equipments.

15. The communication method according to claim 9, wherein a transmission power for another communication between the communication apparatus and the base station is determined using the TPC included in a grant for the other communication with accumulating one or more previous TPCs included in grants of the other communication.

16. The communication method according to claim 9, wherein the first set of parameters is different from the second set of parameters.

* * * * *